United States Patent [19]
Ebina

[11] Patent Number: 5,997,788
[45] Date of Patent: Dec. 7, 1999

[54] METHOD OF RELEASING THIN DISCS IN MOLDING

[75] Inventor: Toshiyuki Ebina, Aichi-ken, Japan

[73] Assignee: Kabushiki Kaisha Meiki Seisakusho, Aichi-ken, Japan

[21] Appl. No.: 09/143,237

[22] Filed: Aug. 28, 1998

[30] Foreign Application Priority Data

Sep. 11, 1997 [JP] Japan ..................................... 9-246647

[51] Int. Cl.⁶ ................................................. B29C 45/44
[52] U.S. Cl. ......................... 264/155; 264/1.33; 264/154; 264/161
[58] Field of Search ................................... 264/161, 1.33, 264/106, 154, 155

[56] References Cited

U.S. PATENT DOCUMENTS

| | | | |
|---|---|---|---|
| 4,260,360 | 4/1981 | Holmes et al. | 264/106 |
| 4,372,741 | 2/1983 | Cane et al. | 264/106 |
| 4,880,587 | 11/1989 | Fichlseder et al. | 264/161 |
| 5,690,974 | 11/1997 | Miyairi | 264/106 |
| 5,720,994 | 2/1998 | Asai | 264/1.33 |

FOREIGN PATENT DOCUMENTS

| | | |
|---|---|---|
| 390324 | 4/1991 | Japan . |
| 3278339 | 12/1991 | Japan . |
| 742682 | 10/1995 | Japan . |

*Primary Examiner*—Jan H. Silbaugh
*Assistant Examiner*—Dae Young Lee
*Attorney, Agent, or Firm*—Browdy and Neimark

[57] ABSTRACT

A method of releasing thin discs during molding forms discs with a central aperture with a thin gate connecting the molded disc to a sprue. A male cutter advances under pressure control of an actuator operating the male cutter and implements releasing of the molded discs from the surfaces of a stamper and a mirror plate during mold closing. The molded disc and the sprue are ejected by a center pin in the mold opening operation.

3 Claims, 5 Drawing Sheets

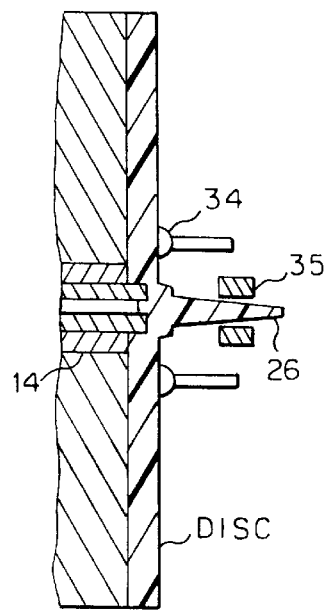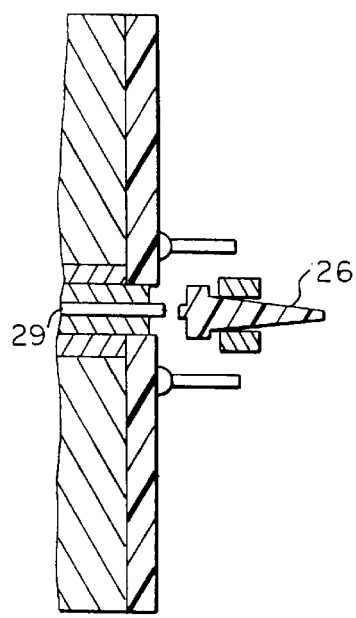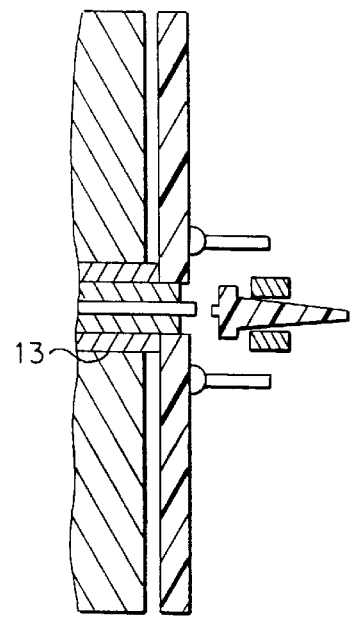
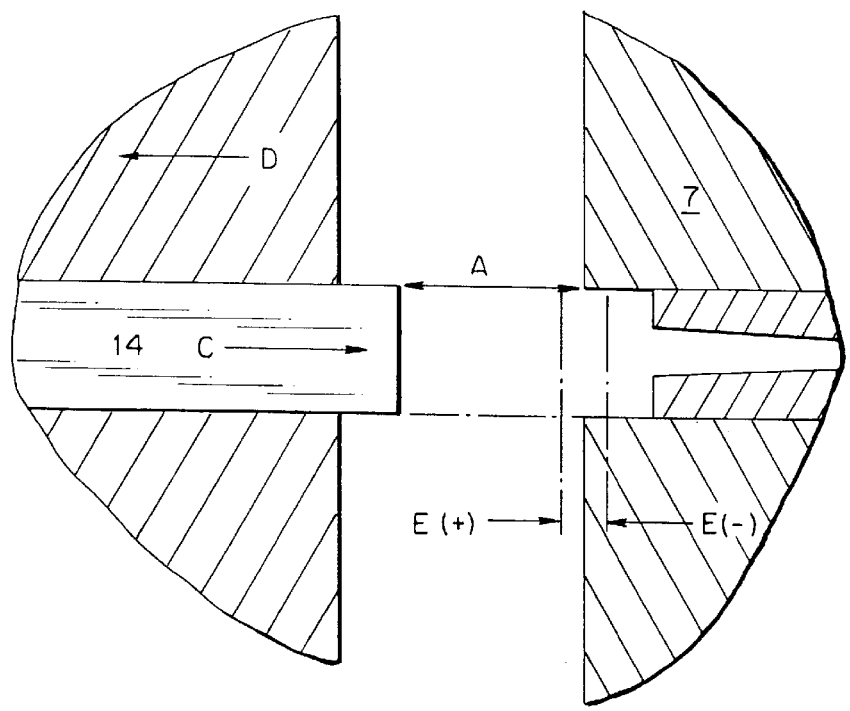

METHOD OF RELEASING THIN DISCS IN MOLDING

FIELD OF THE INVENTION

The present invention relates to a method of molding optical memory CD and DVD discs, and more particularly to molding method to improve the operation of releasing molded discs from the cavity of a mold.

REVIEW OF THE RELATED TECHNOLOGY

A mold for optical discs like CD and DVD includes a cavity with side surfaces including a mirror plate and a stamper. The resin injected into the cavity is solidified therein to mold a disc with a great number of pits which are replicated from the bumps of the stamper. Then the molded discs are released from the cavity.

The invention of Toku-Kai-Hei 3-90324 discloses a such mold.

In disc molding the results of releasing the molded discs, which stick to both side surfaces of the cavity, considerably influences the quality of the molded discs.

The conventional releasing process depends on not only a mechanical ejector but also pneumatic ejector means for blowing compressed air into the clearance between the surfaces of the molded disc and the mirror plate or the molded disc and the stamper.

In the molding cycle, after injected resin has been solidified in the cavity to some extent the mold starts to open. Then, after being pneumatically released from the cavity, the molded discs are mechanically ejected. If during this mold opening operation pneumatic releasing is incomplete, and the molded discs are compulsorily released by mechanical ejecting while still partly attached, a boundary is created between an incompletely released portion and a completely released portion; or, clouds appear on the molded disc.

To improve the above problem, Jitsu-kou-Hei 7-42682 discloses that after a central aperture of the disc has been severed by a male cutter, the mold is opened and then the compressed air blows from both of two air outlets. One is provided on the inner periphery of an inner stamper retainer toward the outer periphery of the molded disc and the other air outlet is provided on an outer stamper retainer toward the center portion of the molded disc, so as to rapidly and exactly release the molded disc by pneumatic ejection.

However, even if such rapid release by pneumatic ejection is carried out, the quality of the DVD discs will not be guaranteed in the above-described conventional method because first the mold is opened to eject the sprue and only then does the method implement air blowing for releasing the molded disc. The molded disc has to remain for a few short seconds on the stamper during mold opening.

Though such a process is all right for CD discs, which are thicker than DVD discs, such a process is not all right for DVD discs. The reason is that when the molded thin DVD discs are kept sticking to the stamper during mold opening, the surface of the molded disc at the stamper side is kept higher in temperature than the opposite surface released from the surface of mirror plate which is exposed to the air, which causes the thin disc to warp.

Rapid release of the molded discs from the stamper as soon as the mold opens is inevitably necessary for preventing DVD discs from warping; but if the molded disc has been released from the surface of the cavity and gate cutting has been completed before mold opening, this causes a new problem: the molded disc falls into the mold opening.

FIGS. 6(a)–6(c) show an ordinary gate cutting method. FIG. 6(a) shows a cross section at a portion along a sprue and gate before gate cutting and FIG. 6(b) shows a cross section at a portion along a sprue and gate after gate cutting.

If, before mold opening, both surfaces of the molded disc have been pneumatic released from the stamper, the molded disc will fall apart from the sprue as soon as the mold opens. This is shown in FIG. 6(c).

SUMMARY OF THE INVENTION

In light of the above mentioned problems, it is an object of the present invention to provide a novel disc molding method which releases a thin molded discs, for example a DVD disc, from the cavity of a mold without warping or clouding of the molded disc.

It is another object of the present invention to provide a novel disc molding method which implements pneumatic releasing before the mold opening to prevent warp on thin molded discs like DVD discs.

It is another object of the present invention to provide a novel disc molding method which prevents the molded discs from falling apart from the sprue upon opening the mold.

It is another object of the present invention to provide a novel disc molding method which advances a male cutter toward the female cutter and stops it at a predetermined position due to pressure control of a hydraulic actuator, keeping the molded disc connected through a thin gate thickness with a sprue.

It is another object of the present invention to provide a novel disc molding method which avoids an increase of gate cutting time by advancing the male cutter to the position where the gate becomes very thin before mold opening, and then to cut the remaining thin gate on ejecting the sprue.

BRIEF DESCRIPTION OF THE DRAWING

The above and other objects and nature and advantages of the present invention will become more apparent from the following detailed description of an embodiment taken in conjunction with drawings, wherein:

FIGS. 4(a)–(c) are schematic sectional views of the robot holding the sprue and molded disc then they are ejected.

FIG. 5 is cross-sectional view illustrating the relation among the slight opening D of the mold, a gate thickness A, an advancing stroke C, and a distance E between the tip faces of male and female cutter.

DETAILED DESCRIPTION OF THE PREFERRED EMBODIMENT

This invention will be described in further detail by way of example with reference to the accompanied drawings.

Figure 1:
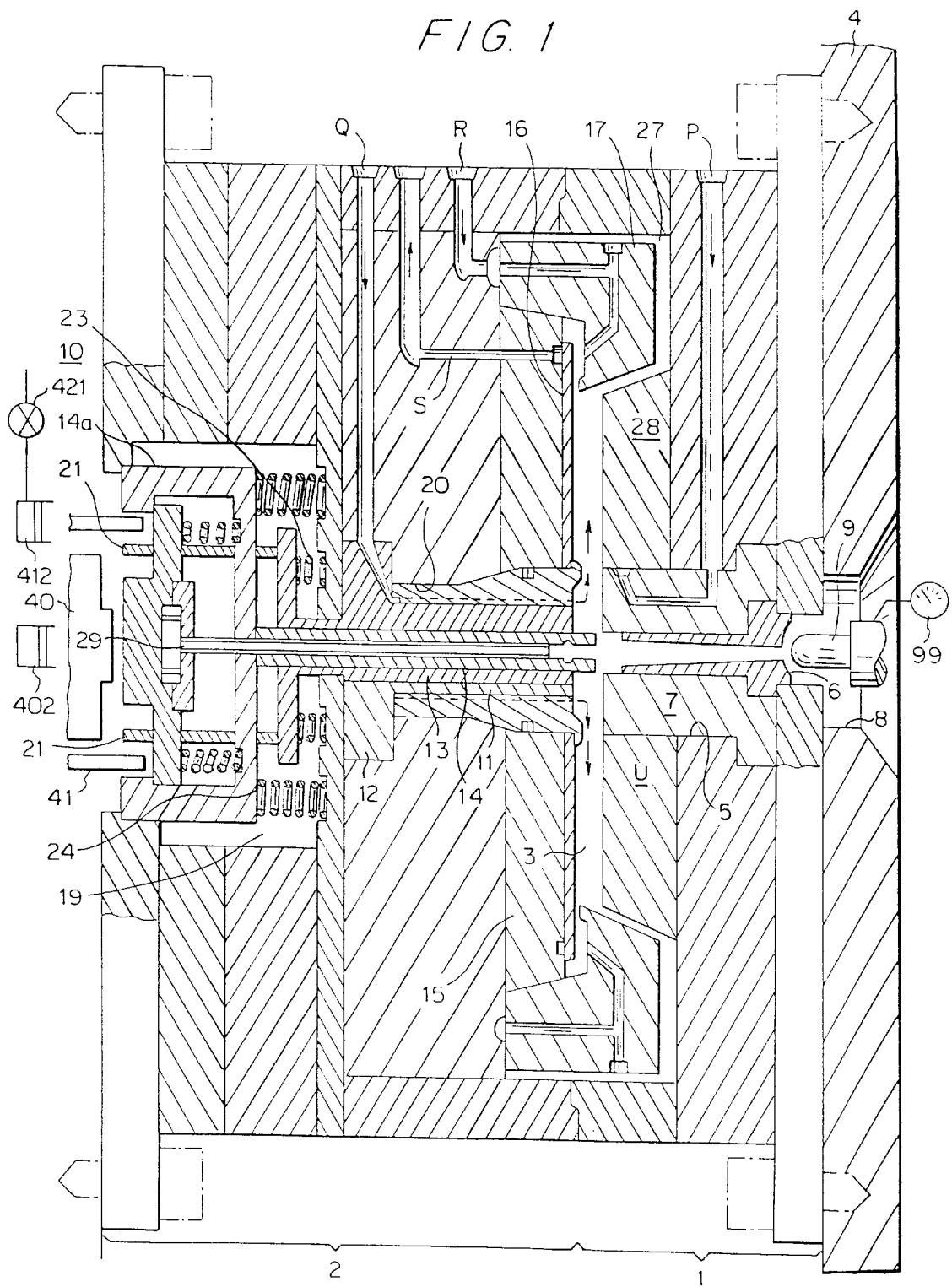
FIG. 1 shows an elevational view in section of the mold of the invention mounted on the stationary and movable platen.
Figure 2:
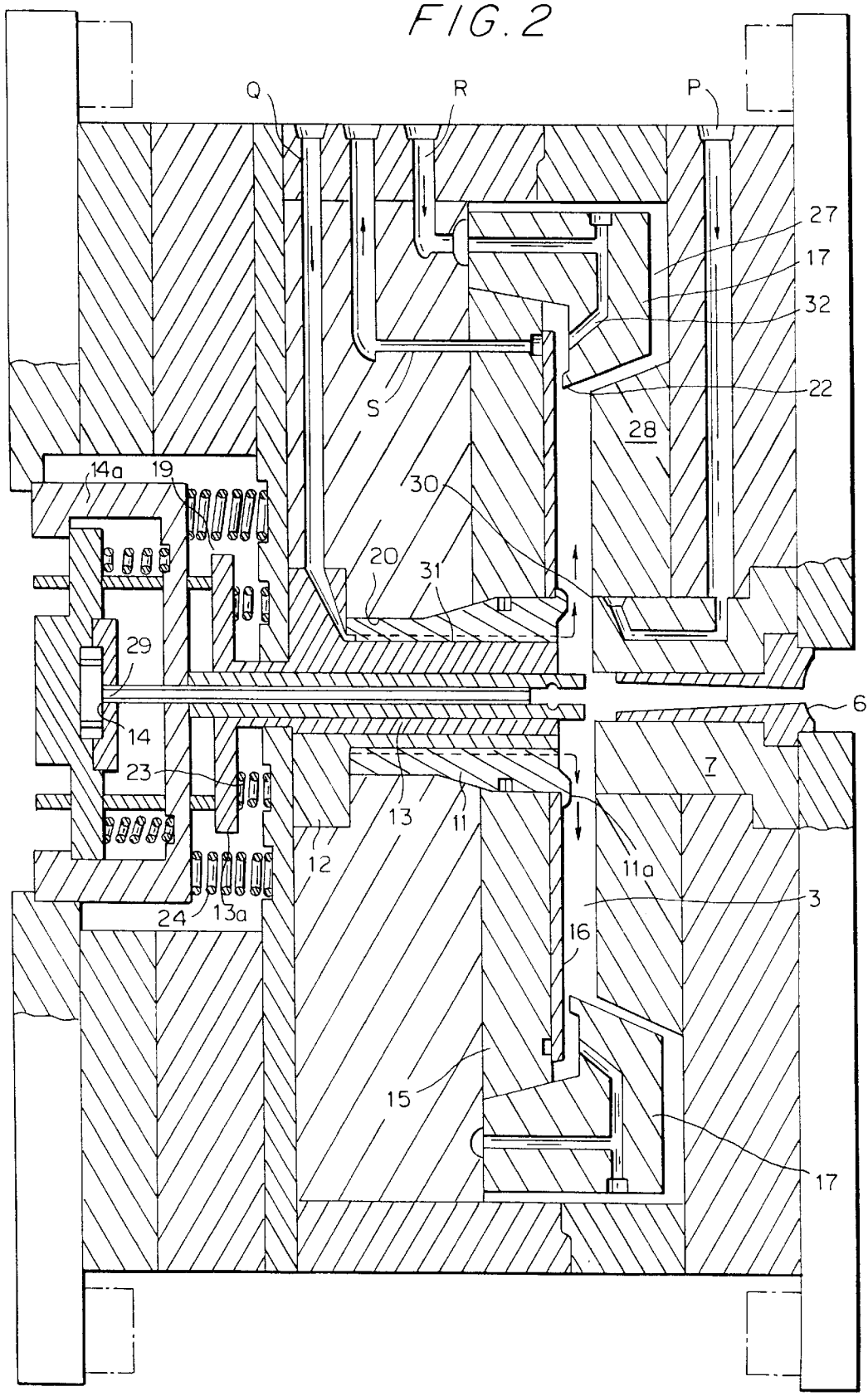
FIG. 2 shows a detailed elevational view in section of the mold of the invention.

In FIGS. 1 and 2, a stationary moldhalf 1, fixed to a stationary platen 4 with a tapered opening 8, and a movable moldhalf 2, fixed to a movable platen 10, have made contact due to mold closing to form a cavity 3.

The stationary moldhalf 1 has a penetrated hole 5 for inserting a female cutter 7 in which a sprue bushing 6 is inserted. A nozzle 9 can be reciprocated to contact the sprue bushing 6 through the tapered opening.

An inner stamper retainer 11, a sleeve 12 for retaining the stamper 16 on the plate of the movable mold half 2, an ejector sleeve 13, a male cutter 14 and a center pin 29 are concentrically inserted in the penetrated hole 20 provided in a center portion of the movable mold half 2. In FIG. 1 and FIG. 2, a stamper 16 is mounted on a movable mirror plate 15 of the movable moldhalf 2, retained at the inner and outer periphery of the stamper 16 by a claw 11a of the inner stamper retainer 11 and a claw 22 of an outer stamper retainer 17.

An ejector sleeve 13 with a flange 13a, which is capable of reciprocating in a space 19, is provided for the movable moldhalf 2. When an ejector plate 40, actuated by a hydraulic cylinder 402 (shown schematically in FIG. 1), advances to push a pair of rods 21 fixed on the surface of the flange 13a of the ejector sleeve 13, the ejector sleeve 13 is advanced. Plural springs 23 for drawing back the ejector 13 are located in the space 19.

A male cutter 14 with a flange 14a is reciprocatingly inserted in the hollow ejector sleeve 13. Advancing a pair of ejecting bars 41, which are actuated by a hydraulic cylinder 412 (shown schematically in FIG. 1), causes the male cutter 14 to advance. A center ejector pin 29 is reciprocatingly inserted in the hollow male cutter 14, which has an undercut portion U at its tip portion. Plural springs 24, for drawing back the male cutter 14, are located in the space 19.

As best seen in FIG. 2, a gap 27 between the upper surface of the outer retainer 17 and an inclined side surface of a stationary mirror plate 28 is for receiving air remaining in the cavity on injecting. An air-blowing passage P provided in the stationary moldhalf 1 leads to a circular clearance 30 formed between the inner periphery of the penetrated hole 5 and the outer periphery of the female cutter 7.

Another air-blowing passage Q provided in the movable moldhalf 2 leads to a circular clearance 31 along the inner periphery of the inner stamper retainer 11. An air blowing passage R, also provided in the movable moldhalf 2, leads to an air passage 32 provided on the inside of the outer stamper retainer 17.

An air suction passage S leads to the reverse side of the stamper 16 so that the stamper adheres to the surface of movable mirror plate 15.

Figure 3A:
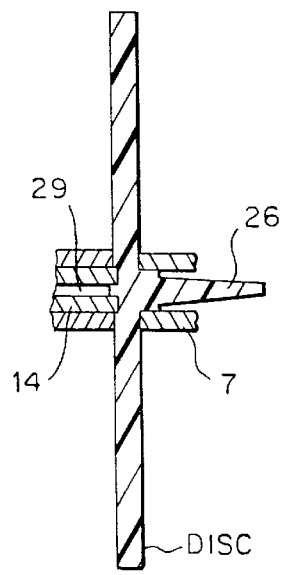
FIG. 3(a)–3(c) are schematic sectional view of the male cutter advancing to the female cutter before mold opening.
Figure 3B:
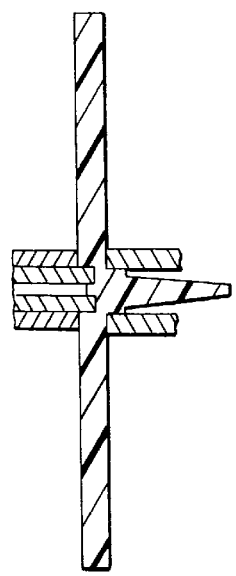

In operation, after the mold is closed melted resin is injected into the cavity 3 through the sprue bushing 6. After injection of the melted resin has been completed the male cutter 14 advances towards the female cutter 7 to stop at a predetermined position just before reaching the front of the female cutter 7. A pressure control valve 421 for the hydraulic actuator 412 is operated by detecting the increase in resin pressure of the gate, resulting in keeping the sprue 26 connected to the disc as shown in FIG. 3(b).

Optionally, a resin pressure valve 99 may be provided. However, the resin pressure may also be measured indirectly by the distance which the male cutter 14 advances (i.e., stroke C of FIG. 5). That is, the pressure can be calculated from the stroke, the temperature of the mold at various internal points, and so on. When resin leaves the nozzle 9 and enters the sprue bushing 6 it rapidly cools and becomes more resistant to flow.

During a cycle of injection compression molding the movable moldhalf 2 is slightly pushed back by the resin injection pressure, which slightly opens the mold. The advancing stroke of the male cutter 14 needs to be slightly elongated to compensate for the slightly retracted length of the movable moldhalf 2. The male cutter 14 is made to advance slightly on opening of the mold.

FIG. 5 shows the preferred relations among the slight opening length D of the mold, a gate thickness A, the advancing stroke C, and the distance E between the tip faces of the male and female cutters 14, 7 at the position where advance of the male cutter is stopped by the pressure control of the hydraulic actuator 412 (visible in FIG. 1).

It is preferable for DVD discs that the distance E be between 0.03 mm to 0.15 mm.

The advancing stroke C of the male cutter 14 has to do with pressure under which the hydraulic actuator 412 is operated. Inappropriate hydraulic pressure causes the male cutter 14 to stop along its way, resulting in a thick gate which is difficult to cut, or, to advance to position where the gate is completely cut, resulting in separating the molded disc from the sprue.

The following table shows a relation among the pressure of hydraulic actuator, the advancing stroke C of the male cutter 14, and a slight opening length of the mold.

| Hydraulic pressure | Advancing stroke: C | Mold Opening Length: D | Gate thickness: E = A + D − C | Molding results |
|---|---|---|---|---|
| 20 kg/cm² | 0 mm | 0.25 mm | 0.55 mm | I |
| 22 | 0.25 | 0.25 | 0.30 | I |
| 25 | 0.30 | 0.25 | 0.25 | I |
| 28 | 0.40 | 0.25 | 0.15 | S |
| 30 | 0.45 | 0.25 | 0.10 | S |
| 32 | 0.50 | 0.25 | 0.05 | S |
| 35 | 0.52 | 0.25 | 0.03 | S |
| 40 | 0.60 | 0.25 | −0.05 | F |
| 60 | 0.70 | 0.25 | −0.15 | F |

I: gate cutting due to the ejecting of the center pin was impossible because E is too thick.
S: appropriate gate cutting was successfully implemented.
F: The molded discs fell when opening the mold because hydraulic pressure of the pressure control valve was set too high.

In the present invention an air blowing process is implemented during mold closing is as follows:

Compressed air is blown through the air blowing passage P in the stationary moldhalf 1 from the circular clearance 30 formed between the inner periphery of the penetrated hole 5 and the outer periphery of the female cutter 7. Compressed air is also blown through the air blowing passage Q provided in the movable moldhalf 2 from the circular clearance 31 along the inner periphery of the inner stamper retainer 11. Compressed air is blown through the air blowing passage R provided in the movable moldhalf 2 from the air passage 32 provided at the inside of the outer stamper retainer 17.

The compressed air blowing through the air blowing passages Q and R helps to release the molded disc from the surface of the stamper 16 along both directions, from the central portion and also from the outer periphery of the molded disc.

In addition, the compressed air from the air passage 32 through the air blowing passage R helps not only to release the molded disc from the surface of the stamper 16 but to press the stamper 16 onto the surface of the movable mirror plate 15 due to the air suction force from the air suction passage S, resulting in tightly adhering the stamper onto the surface of the movable mirror plate 15.

Figure 3C:
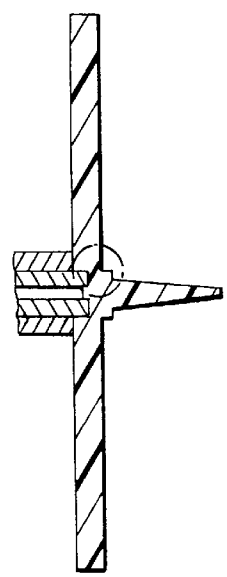
Figure 3D:
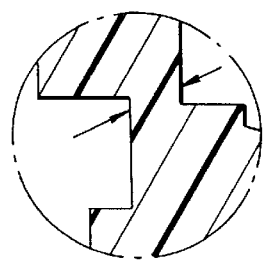
FIG. 3(d) is a detailed view of FIG. 3(c).
Figure 6A:
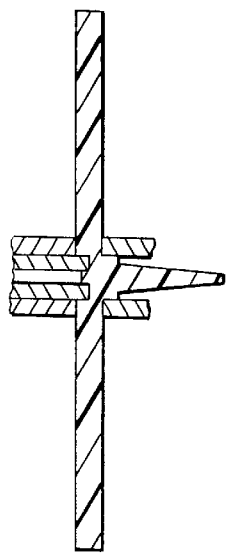
FIGS. 6(a)–(c), labelled "prior art", illustrates how the gate is cut in an ordinary method.
Figure 6B:
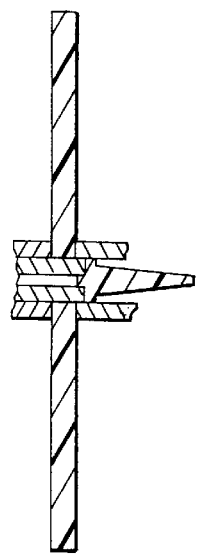
Figure 6C:
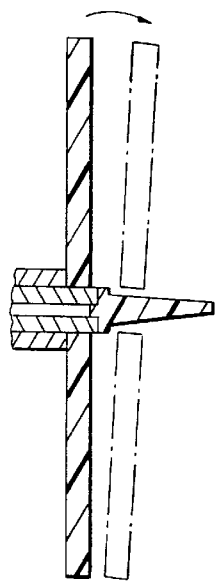

Besides the air blowing process, the present invention includes the following steps: As the movable moldhalf 2 is retreating, the sprue 26 is extracted from the sprue bushing 6 toward the movable moldhalf side. The sprue 26 sticks to the undercut portion U provided near the tip of the center pin 29. As shown in FIG. 3(c) the sprue 26 is connected to the molded disc through a thin gate. Detailed view FIG. 3(d) shows the thin gate indicated by arrows.

When retraction of the movable moldhalf 2 is completed, the hands 35 of a robot grasp the sprue 26 and vacuum pads 34 of the robot stick to molded disc as shown in FIG. 4 (a). Next, the center pin 29 advances to separate the sprue 26 from the molded disc as shown FIG. 4(b) and to eject the sprue 26, and simultaneously to cut the thin gate without further advancing the male cutter 14. Then, after the ejector sleeve 13 advances to eject the molded disc as shown in the FIG. 4(c), the ejected disc is taken out of the mold with the ejected disc sticking to vacuum pads 34.

An exemplary diameter of the male cutter is 15 mm, for a cross-sectional area of 1.966 cm$^2$. The area of the actuator 412 piston is 11.78 cm$^2$, so at 30 kg cm$^2$ of hydraulic pressure the resin pressure is about 200 kg/cm$^2$.

The disc is actually separated from the stamper by a thin sheet of compressed air coming through the circular clearance 31 (FIG. 2), but the gap created by this separation is too small to be seen in FIGS. 4a and 4b.

The molding cycle of the present invention is completed by the processes described above. Although the illustrated example is that the stamper 16 is mounted on the side of the movable moldhalf 2, it is possible to mount the stamper 16 on the side of the stationary moldhalf 1.

It is an advantage of the invention that thin discs are molded without warp and molded discs are prevented from falling into the opening of the mold, despite pneumatic releasing, before the mold is opened. An additional advantage of the invention is to avoid increased gate cutting time due to advancing the male cutter to the position where the gate is nearly cut before mold opening to cut the remaining thin gate with ejection of the sprue.

It is to be understood that the form of the present invention herein shown and described is to be taken as a preferred embodiment and that various changes in shape, size and arrangement of parts may be resorted to without departing from the spirit of my invention or the scope of the subjointed claims.

What is claimed is:

1. A method of molding and releasing a thin resin molded disc from a cavity of a mold, the method comprising steps of injecting melted resin into the cavity to mold the thin resin molded disc and then:
   (a) advancing a male cutter into the cavity and thin molded disc;
   (b) stopping the male cutter at a predetermined position wherein the thin molded disc is connected to a sprue by a thin gate;
   (c) blowing compressed air through a plurality of air passages provided in the mold in order to release the molded thin molded disc from surfaces of a stamper and a mirror plate of the mold;
   (d) extracting the sprue, which sticks to an undercut portion of the male cutter, from a sprue bushing provided with a stationary half of the mold, while retracting a movable half of the mold to open the mold; and
   (e) advancing a center pin concentrically inserted in the male cutter to eject the sprue from the male cutter;
   wherein the step of advancing the center pin to eject the sprue also cuts the thin gate which connects the molded disc to the sprue.

2. The method according to claim 1, comprising molding by an injection compression method.

3. The method according to claim 1, wherein the thickness of the thin gate, which connects the molding disc to the sprue, ranges between approximately 0.03 mm and approximately 0.15 mm.

* * * * *